(12) United States Patent
Lee et al.

(10) Patent No.: US 8,781,015 B2
(45) Date of Patent: Jul. 15, 2014

(54) METHOD FOR GENERATING HYBRID CODEBOOK AND HYBRID MU-MIMO SYSTEM

(75) Inventors: Jung Woo Lee, Seongnam-si (KR); Kyeong Jun Ko, Seoul (KR); Sung Kyu Jung, Seoul (KR)

(73) Assignee: Seoul National University Industry Foundation, Seoul (KR)

( * ) Notice: Subject to any disclaimer, the term of this patent is extended or adjusted under 35 U.S.C. 154(b) by 548 days.

(21) Appl. No.: 13/072,564

(22) Filed: Mar. 25, 2011

(65) Prior Publication Data

US 2012/0177097 A1 Jul. 12, 2012

(30) Foreign Application Priority Data

Jan. 6, 2011 (KR) .................. 10-2011-0001274

(51) Int. Cl.
*H04B 7/02* (2006.01)
*H04L 1/02* (2006.01)

(52) U.S. Cl.
USPC ............ 375/267; 375/260; 375/299; 375/347

(58) Field of Classification Search
USPC ........... 375/260, 267, 299, 347; 370/203–211
See application file for complete search history.

(56) References Cited

U.S. PATENT DOCUMENTS

2009/0190685 A1* 7/2009 Kimura ...................... 375/267
2012/0140848 A1* 6/2012 Lin et al. .................... 375/296

* cited by examiner

*Primary Examiner* — Curtis Odom
(74) *Attorney, Agent, or Firm* — William Park & Associates Patent Ltd.

(57) ABSTRACT

A method for generating a hybrid codebook for a Multi-User Multiple-input Multiple-Output (MU-MIMO) system includes the steps of: generating a parent matrix set including a plurality of M×M unitary matrices when the number of transmitter antennas is M; and generating a child matrix set dependent on the parent matrix set by using training vectors included in a random training set and each column for each unitary matrix of the parent matrix set as an initial vector codebook.

9 Claims, 10 Drawing Sheets

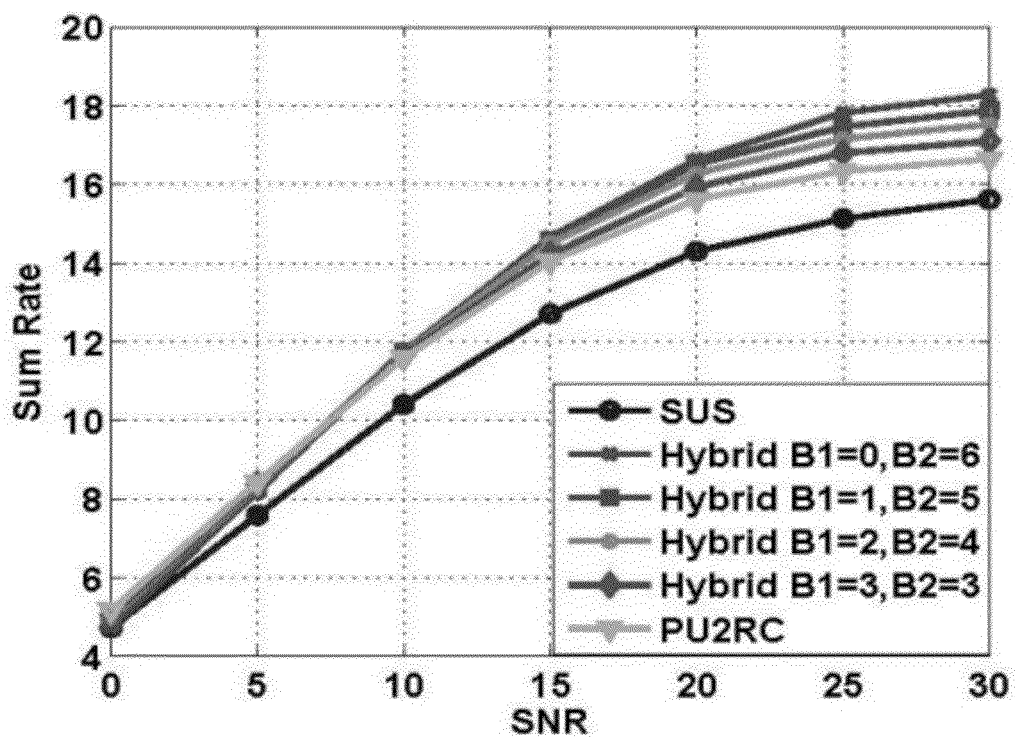

METHOD FOR GENERATING HYBRID CODEBOOK AND HYBRID MU-MIMO SYSTEM

CROSS-REFERENCES TO RELATED APPLICATION

The present application claims priority under 35 U.S.C. §119(a) to Korean application number 10-2011-0001274, filed on Jan. 6, 2011, in the Korean Intellectual Property Office, which is incorporated herein by reference in its entirety as set forth in full.

BACKGROUND

1. Technical Field

The present invention relates to a communication system, and more particularly, to a method for generating a hybrid codebook and a hybrid Multi-User Multiple-Input Multiple-Output (MU-MIMO) system.

2. Related Art

An MIMO scheme is one of methods for increasing data transmission efficiency in a wireless communication system. The MIMO scheme can be classified into a Single-User MIMO (SU-MIMO) scheme and a Multi-User MIMO (MU-MIMO) scheme, depending on whether data can be transmitted to multiple users by using the same resource. The MU-MIMO scheme can transmit different data to multiple users simultaneously by using the same resource, and it has been known that the MU-MIMO scheme can obtain higher spectral efficiency than the SU-MIMO scheme because of multi-user diversity gain and spatial multiplexing gain thereof.

An MIMO system can be classified into an open-loop scheme in which a transmitter performs a communication without knowing a channel condition, and a closed-loop scheme in which a transmitter performs a communication while referring to channel information fed back from a receiver. The closed-loop scheme is widely used because it can approach a theoretical transmission capacity by applying independent modulation and coding schemes to transmit antennas according to channel states.

In the closed-loop MU-MIMO system, a receiver can use a codebook to send channel information to a transmitter. Codewords constructing the codebook represent different channel states of channels formed between the transmitter and the receiver. The receiver estimates a channel by using a pilot signal received from the transmitter, selects a codeword corresponding to the estimated channel, and informs the transmitter of the channel state by feeding a corresponding codeword index back to the transmitter. That is, in a case in which beamforming is performed at a base station by using column vectors of the codebook existing in the receiver as beamforming vectors, downlink channel quality is calculated to generate downlink channel quality indicators, and then, a position of a column vector corresponding to the best downlink channel quality indicator and the corresponding downlink channel quality indicator are fed back to the transmitter.

Accordingly, the transmitter selects receivers, which are to receive data, as many as the number of transmit antennas in order to maximize a downlink data rate, considering the feedback downlink channel quality indicator and the index of the corresponding beamforming vector.

One of beamforming methods using a codebook is Per User Unitary Rate Control ($PU^2RC$). The $PU^2RC$ scheme uses a codebook constructed by several appointed unitary precoding matrices and transmits data by selecting the receiver group having the best reception quality through grouping of receivers using the same precoding matrix. Since the $PU^2RC$ scheme determines a receiver and a precoding matrix in consideration of only a single-cell environment, its performance may be limited by interference between base stations in a multi-base station environment. In addition, since the precoding vector is determined in such a state that the codewords is constructing the set of beamforming vectors, that is, the codebook, have already been determined, interference between receivers may not be completely eliminated. Moreover, in order to simplify the architecture of the system and obtain superior performance, it is necessary to increase the number of receivers which provide feedback information to transmitters.

Another example of the beamforming method using the codebook is Zero-Force Beam Forming (ZFBF). In the ZFBF scheme, a receiver estimates a channel from a pilot signal received from a transmitter, quantizes the estimated channel, and feeds an index of channel state information, based on the quantization result, back to the transmitter. In the ZFBF scheme, a precoding matrix is not fixed and interference between receivers can be made zero. However, since accurate channel state information is needed in order to eliminate the interference, the number of feedback bits is increased. Since beamforming information is calculated based on feedback information in real time, system complexity is increased.

As such, the $PU^2RC$ scheme and the ZFBF scheme have opposite advantages and disadvantages. In particular, in order to obtain superior system performance, the ZFBF scheme needs more feedback bits, whereas the $PU^2RC$ scheme needs more receivers. Since the two schemes have the opposite features, it cannot be guaranteed which of the two schemes is better.

SUMMARY

In one embodiment of the present invention, a method for generating a hybrid codebook for an MU-MIMO system includes the steps of: generating a parent matrix set including a plurality of M×M unitary matrices when the number of transmitter antennas is M; and generating a child matrix set dependent on the parent matrix set by using training vectors included in a random training set and each column for each unitary matrix of the parent matrix set as an initial vector codebook.

In another embodiment of the present invention, a hybrid MU-MIMO system includes a transmitter and a receiver, wherein the receiver includes: a channel estimation unit configured to estimate a channel by using by using a pilot signal received from the transmitter; a hybrid codebook including a parent matrix set with a plurality of unitary matrices and a child matrix set dependent on each column of the respective unitary matrices; a beamforming matrix selection unit configured to select any one parent matrix among the parent matrix set by referring to the hybrid codebook, select any one child matrix as a beamforming matrix among the child matrix set dependent on the selected parent matrix, and providing the transmitter with channel quality information corresponding to the selected beamforming matrix and an index of the selected beamforming matrix; and a demodulation unit configured to demodulate a signal received from the transmitter.

In another embodiment of the present invention, a hybrid MU-MIMO system includes a transmitter and a receiver, wherein the transmitter includes: a hybrid codebook including a parent matrix set with a plurality of unitary matrices and a child matrix set dependent on each column of the respective unitary matrices; a scheduler configured to receive an index of a codeword and channel quality information fed back from the receiver, and select a precoding matrix and a user set having largest sum-rate; a precoder configured to precode a plurality of input data, based on the precoding matrix selected by the scheduler; and a modulation unit configured to modulate the precoded data.

BRIEF DESCRIPTION OF THE DRAWINGS

Features, aspects, and embodiments are described in conjunction with the attached drawings, in which:

FIG. 11 is a graph showing the sum-rate comparison of a ZFBF (SUS) scheme, a PU²RC scheme, and a hybrid scheme of the present invention with respect to SNR

DETAILED DESCRIPTION

Figure 1:
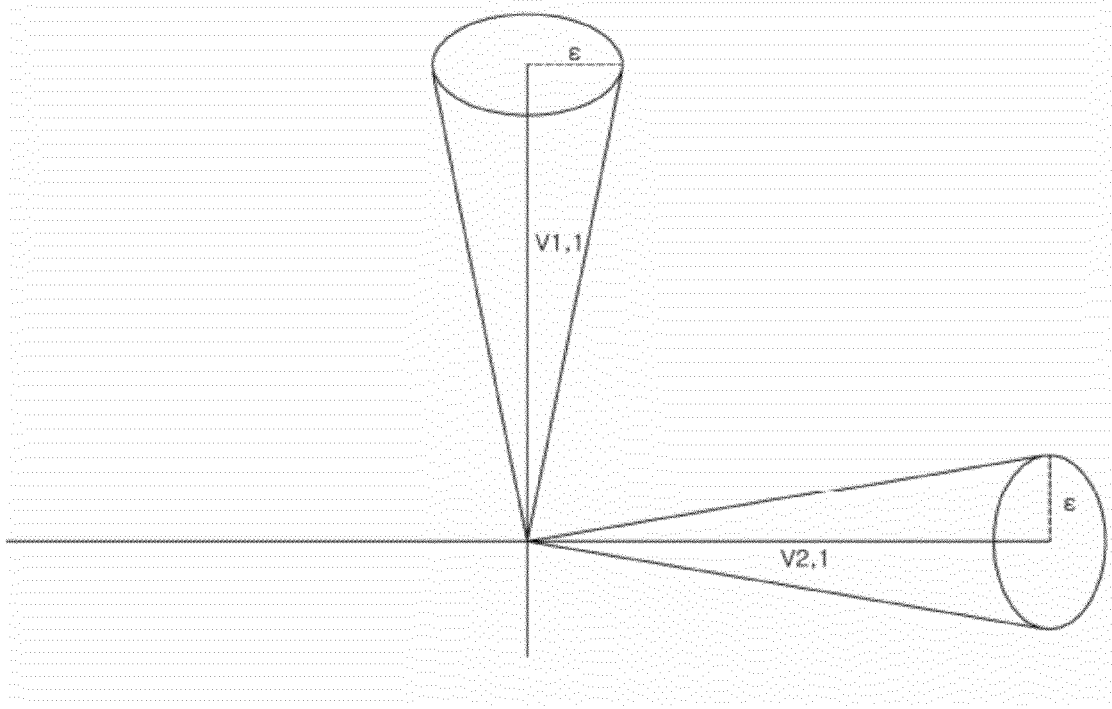
FIG. 1 illustrates a training sample distribution for constructing a vector codebook which is applied to the present invention.

Hereinafter, a method for generating a hybrid codebook and a hybrid MU-MIMO system according to the present invention will be described below with reference to the accompanying drawings through exemplary embodiments.

The present invention proposes a codebook having merits of both ZFBF scheme and PU²RC scheme, and an MU-MIMO system using the same. In the sense that the ZFBF scheme and the PU²RC scheme are combined, the codebook and the MU-MIMO proposed in the present invention may be referred to as a hybrid codebook and a hybrid MU-MIMO system, respectively.

Hereinafter, embodiments of the present invention will be described in more detail with reference to the accompanying drawings.

First, an MU-MIMO downlink channel with a single base station which has M transmit antennas, and $K_T$ receivers (users) with a single receive antenna will be considered. When assuming that the receivers estimate their channels perfectly for block fading channels, the system model of the MU-MIMO downlink channel is given by Equation 1 below.

$$y_i = h_i^H x + n_i, i=1,\ldots,K_T \qquad \text{Eq. 1}$$

where $h_i$ is M×1 channel vectors at user i whose channel entries are independent identically distributed (i,i,d) complex Gaussian with zero mean and unit variance, H is commonly used notation for a channel matrix, $y_i$ is a received signal at user i, and $n_i$ is complex white Gaussian noise for user i with unit variance. In addition, the vector x is an M×1 transmitted symbol vector containing information symbols of a selected set of users $U=\{\pi(1),\ldots,\pi(|U|)\}$. The transmitted signal x is described as Equation 2 below $$x = \sqrt{\frac{P}{|U|}} \sum_{i=1}^{|U|} b_i s_i \qquad \text{Eq. 2}$$

where $s_i$ is a scalar symbol for user i with $E[|s_i|^2]=1$, P is a total transmitted power, and $b_i$ is a precoding vector for an ith selected user which is determined by feedback from each receiver.

In such a system model, the hybrid codebook in which the PU²RC scheme and the ZFBF scheme are combined is proposed. PU²RC scheme uses unitary matrices, and ZFBF uses a Random Vector Quantization (RVQ) or Grassmannian codebook or a vector codebook, e.g., Linde-Buzo-Gray (LBG), as the codebook for an i.i.d. channel.

Therefore, PU²RC codebook consisting of preset unitary matrices is prepared in order to generate the hybrid codebook for the hybrid MU-MIMO system. ZFBF-based vector codebook is generated for columns of each matrix constructing the PU²RC codebook.

More specifically, in the PU²RC codebook, $2^{B_1}$(M×M) unitary matrices are constructed randomly when $B_1$ is the number of feedback bits for the unitary matrices.

In addition, a random training set which is to be used for generating the vector codebook is generated. The training set $T=\{T_1, T_2, \ldots, T_L\}$ is generated from an i.i.d. channel. When the number of feedback bits in the vector codebook is $B_2$, $2^{B_2}/M$ codewords can be constructed using training vectors $T_t$ and LBG algorithm. In this case, it can be constructed to satisfy the following condition for each $v_{i,j}$ ($1 \le i \le M$, $1 \le j \le 2^{B_1}$).

$$1-|v_{i,j}^H T_t|^2 \le \epsilon (1 \le t \le L, 0 \le \epsilon \le 1) \qquad \text{Eq. 3}$$

where $v_{i,j}$ is the ith vector of the jth unitary matrix.

FIG. 1 illustrates a training sample distribution for constructing a vector codebook which is applied to the present invention.

It can be seen that the training samples are distributed to satisfy the condition of Equation 3 from each training sample, and the radius of the training sample is $\epsilon$.

As a result, the number of codewords in the ZFBF codebook of each unitary matrix is $2^{B_2}$, and the number of total feedback bits is $B=B_1+B_2$. The lth ((i−1)·$2^{B_2}$/M+1 ≤ l ≤ i·$2^{B_2}$/M) codeword by $c_{l,j}$ is generated by the LBG algorithm with the condition of Equation 3 for each $v_{i,j}$.

The LBG algorithm is an algorithm which constructs the optimal codebook from the training vectors having several tens times the size of the codebook by an iterative method using the nearest neighbor (NN) condition and the centroid condition. The nearest neighbor condition may be described as Equation 4 below.

$$R_n = \{X : d_c(X, C_n) < d_c(X, C_{n'}), \forall n' \ne n\} \qquad \text{Eq. 4}$$

where X is a channel sample from the training set, $C_n$ is the nth codeword, and $R_n$ is the region represented by $C_n$. $d_c( )$ is the chordal distance, and the chordal distance between spaces A and B is given by Equation 5 below $$d_c(A, B) = \frac{1}{\sqrt{2}} \|A_0 A_0^H - B_0 B_0^H\|_F \qquad \text{Eq. 5}$$

where $A_0$ and $B_0$ are orthonormal bases for spaces A and B, respectively.

The centroid condition in the LBG algorithm is given by Equation 6 below.

$$C_n = U_R I_{M \times N}$$ Eq. 6 where N is the number of receive antennas, and $U_R$ is the unitary eigenvector in the eigen decomposition of the sample covariance matrix R.

$$R = \frac{1}{|R_n|} \sum_{X_m \in R_n} X_m X_m^H$$ Eq. 7

The centroid condition is designed to minimize the average distortion in $R_n$ when $C_n$ represents $R_n$. This process can be summarized as follows.

$$\begin{aligned} C_n &= \underset{C}{\operatorname{argmin}} \frac{1}{|R_n|} \sum_{X_m \in R_n} d_c^2(X_m, C) \\ &= \underset{C}{\operatorname{argmin}} \frac{1}{|R_n|} \sum_{X_m \in R_n} tr(I_N - C^H X_m X_m^H C) \\ &= \underset{C}{\operatorname{argmax}} \, tr(C^H R C) \end{aligned}$$ Eq. 8 where C is the codebook set which consists of $C_n (1 \le n \le 2^B)$, and B is the number of feedback bits.

As such, a set of $2^{B_1}$, (M×M) unitary matrices (a set of upper matrices) are constructed randomly in order to implement the hybrid codebook of the present invention. The random training set T is constructed and $2^{B_2/M}$ codewords (a set of lower matrices) are generated using the LBG algorithm, assuming that each column for each matrix of the random unitary matrix set is an initial vector codebook.

Figure 2:
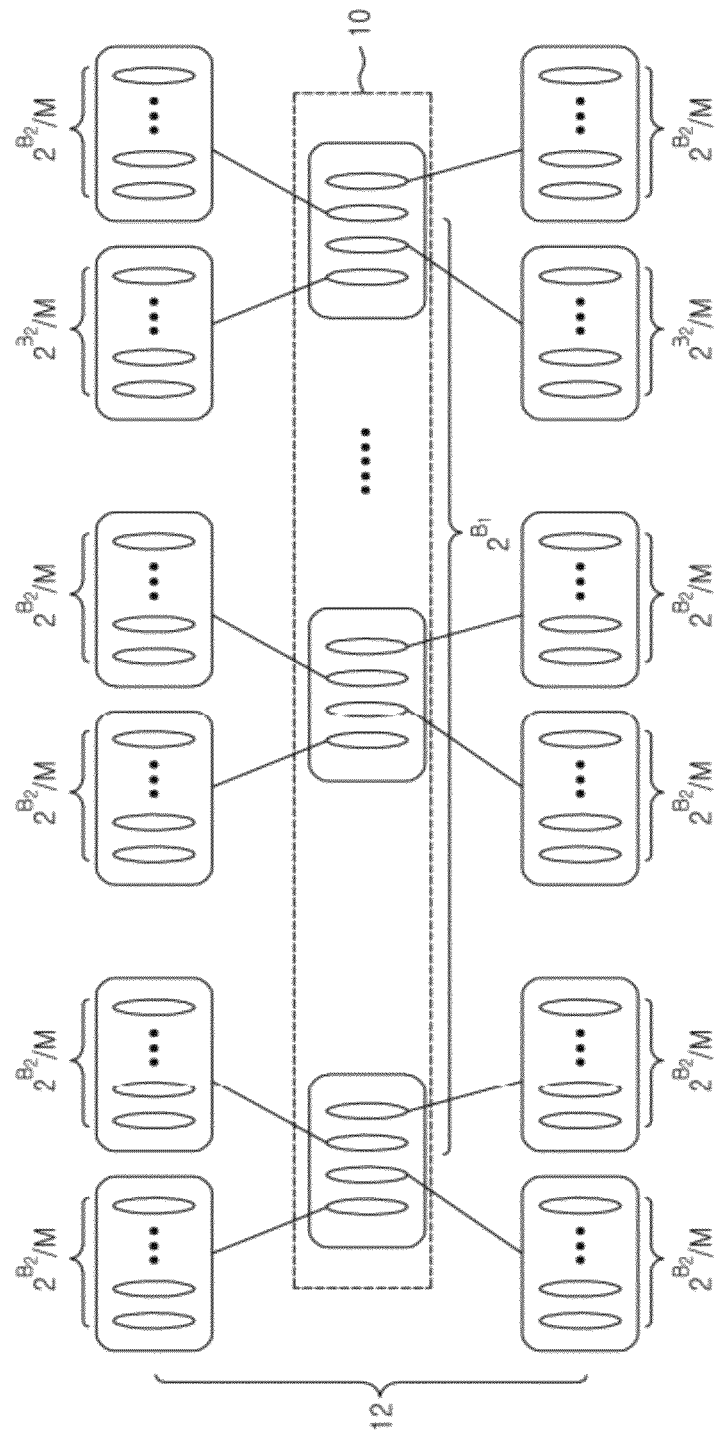
FIG. 2 illustrates a codebook structure according to an embodiment of the present invention.

FIG. 2 illustrates a codebook structure according to an embodiment of the present invention.

As illustrated in FIG. 2, the codebook of the present invention has a hierarchical structure including a parent matrix set 10 and a child matrix set 12 which is dependent on each column of the parent matrix set 10. In addition, the parent matrix set 10 includes $2^{B_1}$ (M×M) unitary matrices, and each child matrix of the child matrix set 12 which is dependent on each column of the parent matrix set 10 includes $2^{B_2}/M$ codewords.

This codebook is stored in the transmitter and the receiver of the MU-MIMO system and is used to generate feedback information in the receiver and determine the precoding matrix in the transmitter.

As compared to the existing one-dimensional codebook, the codebook having the hierarchical structure makes it faster to find the best codeword and thus can reduce the computational complexity significantly in the receivers.

Hereinafter, the hybrid MU-MIMO system using the hybrid codebook proposed in the present invention will be described.

Figure 3:
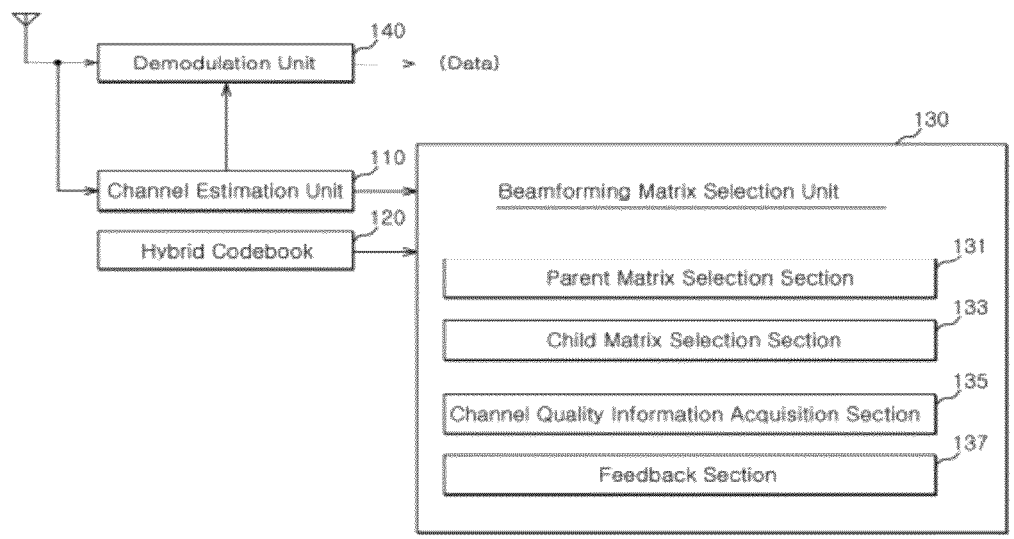
FIG. 3 is a configuration diagram illustrating a receiver of a hybrid MU-MIMO system according to one embodiment of the present invention.

FIG. 3 is a configuration diagram illustrating the receiver of the hybrid MU-MIMO system according to one embodiment of the present invention.

As illustrated in FIG. 3, the receiver 100 of the hybrid MU-MIMO system includes a channel estimation unit 110, a hybrid codebook 120, a beamforming matrix selection unit 130, and a demodulation unit 140.

In order to feed channel information back to the transmitter, the channel estimation unit 110 of the receiver 100 estimates a channel $h_k$ by using a pilot signal received from the transmitter. The beamforming matrix selection unit 130 searches a beamforming matrix by referring to the hybrid codebook 120.

The beamforming matrix selection unit 130 includes a parent matrix selection section 131, a child matrix selection section 133, a channel quality information acquisition section 135, and a feedback section 137.

The parent matrix selection section 131 finds the best codeword vector to satisfy the following condition between all vectors in each unitary matrix included in the parent matrix set.

$$\{i^*, j^*\} = \underset{i,j}{\operatorname{argmax}} |h_k^H v_{i,j}|^2 \; \forall \, i, j$$ Eq. 9 where j* is the index of the unitary matrix which includes the vector having the smallest distance from $h_k$, and i* is the index of the vector in the jth unitary matrix.

Then, the child matrix selection section 133 finds the codeword which satisfies the following condition with i* and j* among $c_{l,j^*} ((i^*-1) \cdot 2^{B_2}/M + 1 \le l \le i^* \cdot 2^{B_2}/M)$.

$$l* = \underset{l}{\operatorname{argmax}} |h_k^H c_{l,j^*}|^2$$ Eq. 10

As can be seen from Equations 9 and 10 above, each receiver feedback for the transmitter is j* and l*. i* is not fed back to the transmitter. In the conventional codebooks, the search complexity is proportional to $2^B$. However, the search complexity of the hybrid codebook according to the present invention is proportional to $M 2^{B_1} + 2^{B_2}/M$ since it has the hierarchical structure. $M 2^{B_1}$ is the complexity by Equation 9, and $2^{B_2}/M$ is the complexity by Equation 10. The reason why the complexity by Equation 10, that is, the complexity for the ZFBF-based vector codebook is not $2^{B_2}$ but $2^{B_2}/M$ is because i* is estimated by l*.

Next, the channel quality information acquisition section 135 calculates an average SINR of the receiver 100.

The SINR of user k which is performed at the transmitter is described as Equation 11 below.

$$SINR_{i,j,k} = \frac{\frac{P}{M} |h_k^H w_{i,j}|^2}{1 + \frac{P}{M} \sum_{n \ne i} |h_k^H w_{n,j}|^2}$$

$$= \frac{\frac{P}{M} \|h_k\|^2 |\tilde{h}_k^H w_{i,j}|^2}{1 + \frac{P}{M} \|h_k\|^2 \sum_{n \ne i} |h_k^H w_{n,j}|^2}$$ Eq. 11 where $w_{i,j}$ is the precoding matrix which is in the null space of $c_{l,j} ((n-1) \cdot 2^{B_2}/M \le l \le n \cdot 2^{B_2}/M, n \ne i, 1 \le n \le M)$ for the selected l and the jth unitary matrix, and $\tilde{h}_k = h_k/\|h_k\|$.

In the PU²RC case with large $K_T$, the exact SINR can be calculated since $w_{i,j} = v_{i,j}$ and each receiver knows the precoding vectors for other users. However, in the case of using the hybrid codebook according to the present invention, the exact SINR cannot be calculated since the precoding vectors are computed from pseudo-inversion of channel matrices. Therefore, the receiver 100 according to the present invention uses average SINR as channel quality information (CQI).

Let $\theta_k$ be the angle between $h_k$ and $\tilde{h}_k$, i.e., $\cos\theta_k=|\tilde{h}_k^H \hat{h}_k|$, $\tilde{h}_k$ is given by Equation 12 below.

$$\tilde{h}_k = (\cos\theta_k)\hat{h}_k + (\sin\theta_k)g_k \qquad \text{Eq. 12}$$

where $\hat{h}_k$ is the quantized channel $c_{l,j}$ of $\tilde{h}_k$, and $\hat{h}_k$ and $g_k$ are orthogonal each other.

The expectation of SINR for the user k can be given by Equation 13 below.

$$E(SINR_k) = E\left(\frac{\frac{P}{M}|h_k^H w_{i,j}|^2}{1+\frac{P}{M}\sum_{n\neq i}|h_k^H w_{n,j}|^2}\right) \qquad \text{Eq. 13}$$

$$(a) \geq \frac{\frac{P}{M}\|h_k\|^2 E(|\tilde{h}_k^H w_{i,j}|^2)}{1+\frac{P}{M}\sum_{n\neq i} E(|h_k^H w_{n,j}|^2)}$$

$$(b) \approx \frac{\frac{P}{M}\|h_m\|^2 \cos^2\theta_k E(|\hat{h}_k^H w_{i,j}|^2)}{1+\frac{P}{M}\|h_k\|^2 E\left(\sum_{n\neq i}|\tilde{h}_k^H w_{n,j}|^2\right)}$$

$$(c) = \frac{\frac{P}{M}\|h_k\|^2 \cos^2\theta_k E(|\hat{h}_k^H w_{i,j}|^2)}{1+\frac{P}{M}\|h_k\|^2 \sin^2\theta_k}$$

$$(d) \approx \frac{\frac{P}{M}\|h_k\|^2 \cos^2\theta_k\left(1-\frac{(M-1)}{M}e\right)}{1+\frac{P}{M}\|h_k\|^2 \sin^2\theta_k} = \gamma_k$$

The hybrid codebook according to the present invention is generated by the LBG algorithm having training samples with the chordal distance between each vector of a unitary matrix, and a training vector is smaller than e. If assuming infinite training samples, the region $A_{i,j}$ which corresponds on each $v_{i,j}$ ($1 \leq i \leq M, 1 \leq j \leq 2^{B_1}$) can be represented perfectly by the training samples, and the distribution of $c_{l,j}$ ($(i-1)\cdot 2^{B_2}+1 \leq l \leq i\cdot 2^{B_2}/M$ about a $v_{i,j}$ is the same altogether about every $v_{i,j}$. Then $E(A_{i,j})=v_{i,j}$ by the centroid condition of the LBG algorithm. Beamforming vector by ZFBF, the set of $w_{i,j}$, is the orthogonal of set of $c_{l,j}$ for $((n-1)\cdot 2^{B_2}+1 \leq l \leq n\cdot 2^{B_2}/M, n \neq i)$, and all orthogonal vectors of all vectors included on $A_{n,j}$ ($n \neq i$) for each j are in $A_{i,j}$ since all vectors exist symmetrically around $v_{i,j}$. Furthermore, the set of $w_{i,j}$ equals to that of $c_{l,j}$ by the symmetric condition. That is one of main characteristics of the hybrid MU-MIMO system according to the present invention.

The feedback information includes j* among $2^{B_1}$ unitary matrices, l* among $2^{B_2}$ codewords in $v_{i^*,j^*}$, and $\gamma_k$ in Equation 13 as channel quality information (CQI), and the feedback section 137 provides the feedback information to the transmitter. In Equation 11, in order to have the largest $\gamma_k$, it is necessary to select the codeword which has the nearest distance with its own channel as shown in Equations 9 and 10.

Hereinafter, the structure of the transmitter based on the feedback method of the receiver described above will be described.

Figure 4:
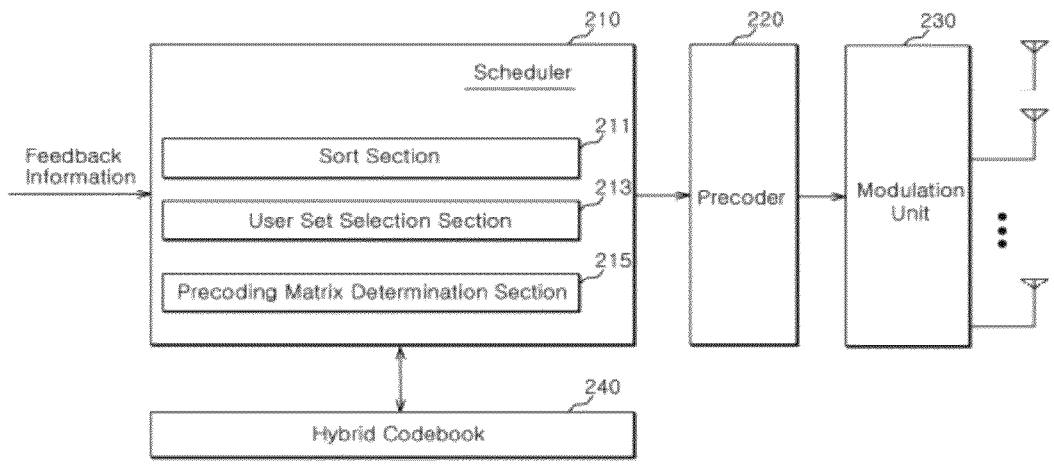
FIG. 4 is a configuration diagram illustrating a transmitter of a hybrid MU-MIMO system according to one embodiment of the present invention.

FIG. 4 is a configuration diagram illustrating the transmitter of the hybrid MU-MIMO system according to one embodiment of the present invention.

As illustrated in FIG. 4, the transmitter 200 includes a scheduler 210, a precoder 220, a modulation unit 230, and a hybrid codebook 240.

After the transmitter gets feedback information from each receiver 100, the transmitter 200 selects the desired set of users, and sends data with the precoding matrix by ZFBF to the users simultaneously. The user selection scheme of the transmitter 200 according to the present invention is to integrate both a greedy algorithm for ZFBF and PU²RC.

At first, the scheduler 210 selects the user which has the largest CQI value among users having feedback information in each $A_{i,j}$ independently.

More specifically, when the set of users in $A_{i,j}$ is noted by $U_{i,j}$, the set of users can be represented as Equation 14 below among users in each $A_{i,j}$.

$$\beta_{i,j} = \arg\max_{k \in U_{i,j}} \gamma_k \qquad \text{Eq. 14}$$

The maximum CQI for each $A_{i,j}$ is given by Equation 15 below.

$$\xi_{i,j} = \max_{k \in U_{i,j}} \gamma_k \qquad \text{Eq. 15}$$

Therefore, a sort section 211 of the scheduler 210 can obtain Equation 16 below by sorting each j in descending order.

$$\alpha_j = \text{sort}_{k \in \beta_{i,j}} \gamma_k \qquad \text{Eq. 16.}$$

A user set selection section 213 selects the optimal user set by performing a greedy algorithm with sorted $\alpha_j$ for the jth unitary matrix (parent matrix set) as Table 1 below.

TABLE 1

Step I: Initialization find $\beta_{i,j} = \arg\max_{k \in U_{i,j}} \gamma_k$ and $\alpha_j = \text{sort}_{k \in \eta_{i,j}} \gamma_k$ for each $A_{i,j}$
$U_j = \emptyset$, $R(U_j) = 0$, $\Phi_j = K_j$
where $K_j = \{\beta_{i,j}\}_i$ for each j Step II: Loop
  while $|U_j| \leq |K_j|$
    find $k^* = \arg\max_{k \in \Phi_j} R(U_j \cup \{k\})$ if $R(U_j \cup \{k^*\}) > R(U_j)$ update
      $U_j = U_j \cup \{k^*\}$, $\Phi_j = \Phi_j - \{k^*\}$
    else break;
  end The sum-rate $R(U_j)$ in Table 1 is given by Equation 17 below.

$$R(U_j) = \sum_{i=1}^{|U_j|} \log_2\left(1+\frac{M}{|U_j|}\xi_{v_{i,j},j}\right) \qquad \text{Eq. 17}$$

where $v_{n,j}$ is the index corresponding to the nth element of a set $\alpha_j$.

When $K_T$ is small, the index i, to which no receiver is allocated, may occur as in PU²RC. The unitary matrix j** with the largest sum-rate is selected.

$$j** = \arg\max_j R(U_j) \qquad \text{Eq. 18}$$

Therefore, the user set U finally selected by the user set selection section 213 is given by Equation 19 below.

$$U = U_{j**} \qquad \text{Eq. 19}$$

A precoding matrix determination section 215 makes the precoding matrix by referring to $c_{j*,j**}$, which is fed back from the selected users, and the hybrid codebook 240. The precoding matrix can be determined using the greedy algorithm since $c_{j*,j**}$, which is fed back from the selected users, is not optimal to support a fixed number (M) of users.

It is very important to select users which have orthogonal channels from each other in the ZFBF system. Otherwise the effective channel amplitude by the precoding matrix is reduced significantly. A semi-orthogonal user selection (SUS) scheme to satisfy semi-orthogonality among the selected user channels is used. However, the SUS scheme is more complex compared to the user selection scheme of PU²RC. This is because the orthogonality measure between user channels should be calculated in the SUS scheme while the user selection scheme of PU²RC needs sorting with CQI only.

Therefore, the precoding matrix determination section 215 uses the ZFBF approach for determining the precoding matrix, and also uses a user selection scheme similar to PU²RC since semi-orthogonality is satisfied by small e in the codebook structure. In this sense, the user selection algorithm by the scheduler 210 of the present invention can be referred to as a hybrid scheme.

When the scheduler 210 determines the user set and the precoding matrix, the precoder 220 precodes data by using the determined precoding matrix. The precoded data are modulated at the modulation unit 230 and then transmitted to the receivers through antennas thereof.

As such, the codebook for SUS of ZFBF is constructed by the LBG algorithm, and the codebook for PU²RC is constructed by the random unitary matrices. On the other hand, the hybrid codebook of the present invention is constructed by the random unitary matrices for $B_1$ feedback bits and is constructed by the LBG algorithm for $B_1$ feedback bits. The hybrid codebook of the present invention includes 100,000 random vector samples which are independent isotropic in offline.

Figure 5:
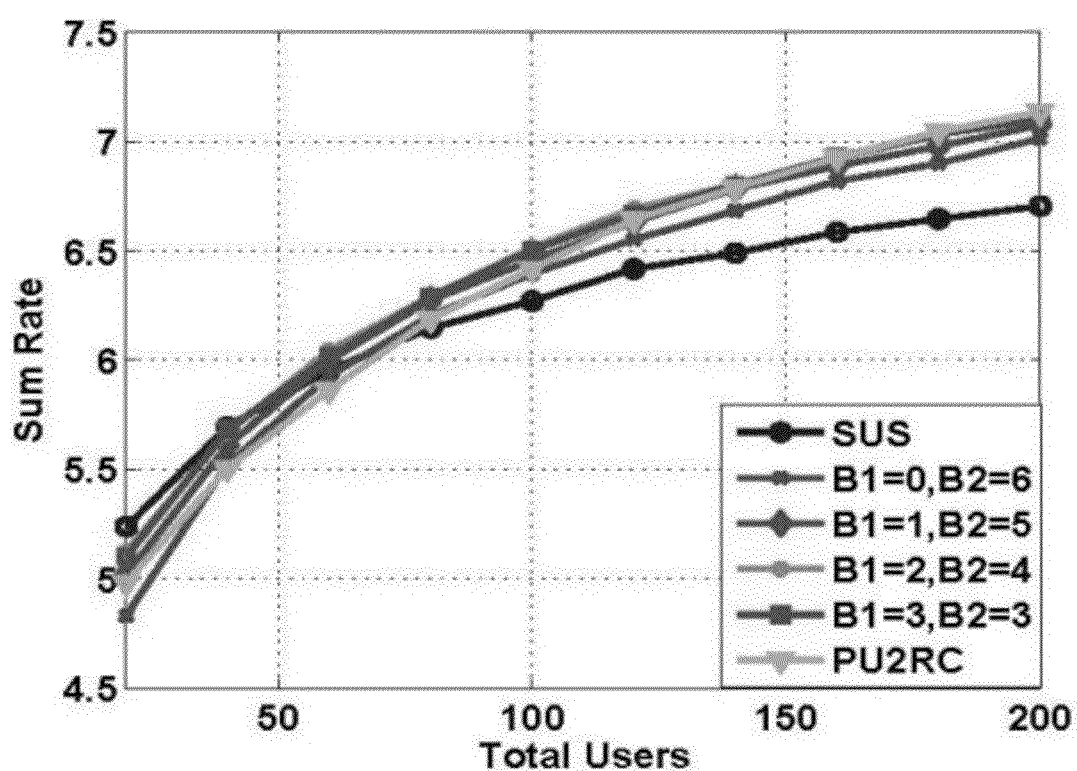
FIGS. 5 to 7 are graphs showing the sum-rate comparison of a ZFBF (SUS) scheme, a PU²RC scheme, and a hybrid scheme of the present invention with respect to the number of total users.
Figure 6:
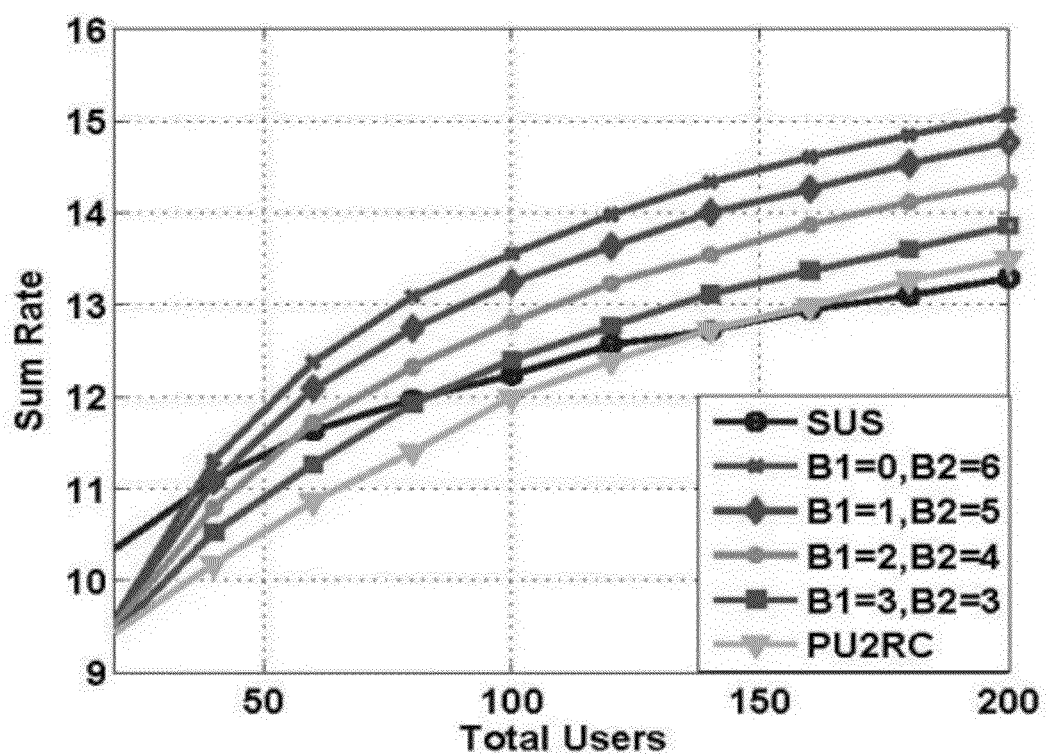
Figure 7:
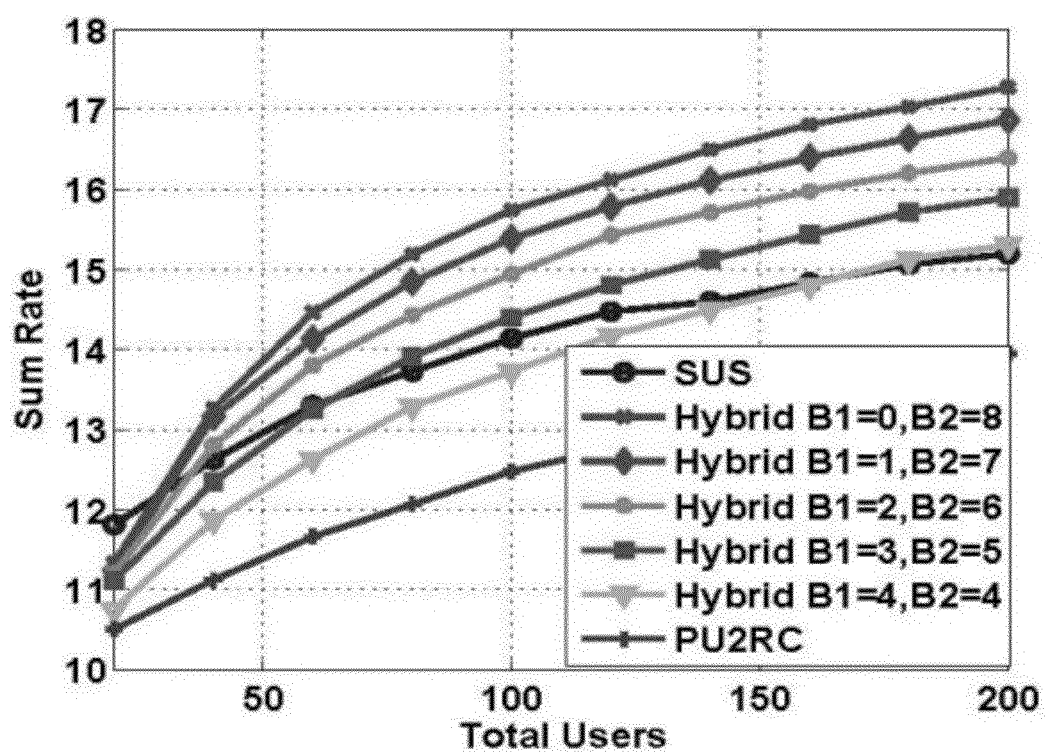

FIGS. 5 to 7 are graphs showing the sum-rate comparison of the ZFBF (SUS) scheme, the PU²RC scheme, and the hybrid scheme of the present invention with respect to the number of total users.

When the number (M) of transmitter antennas is 4, FIG. 5 represents that the number (B) of feedback bits is 6 and SNR is 5 dB, FIG. 6 represents that the number (B) of feedback bits is 6 and SNR is 30 dB, and FIG. 7 represents that the number (B) of feedback bits is 8 and SNR is 30 dB. In this case, the sum-rates with respect to the number of total users were compared.

It can be seen that the ZFBF scheme has the best performance when $K_T$ is small, but the hybrid scheme or the PU²RC scheme is better than the ZFBF scheme as $K_T$ is larger.

In comparison of the hybrid scheme and the PU²RC scheme, it can be seen that the hybrid scheme is better in large $K_T$ as well as small $K_T$.

In addition, it can be seen that the performance gap between the hybrid scheme and the PU²RC scheme becomes larger as the number of feedback bits increases. Furthermore, it can be seen that the system performance becomes better as the weight of the number ($B_2$) of bits fed back by the child matrix set among the number of feedback bits increases.

Figure 8:
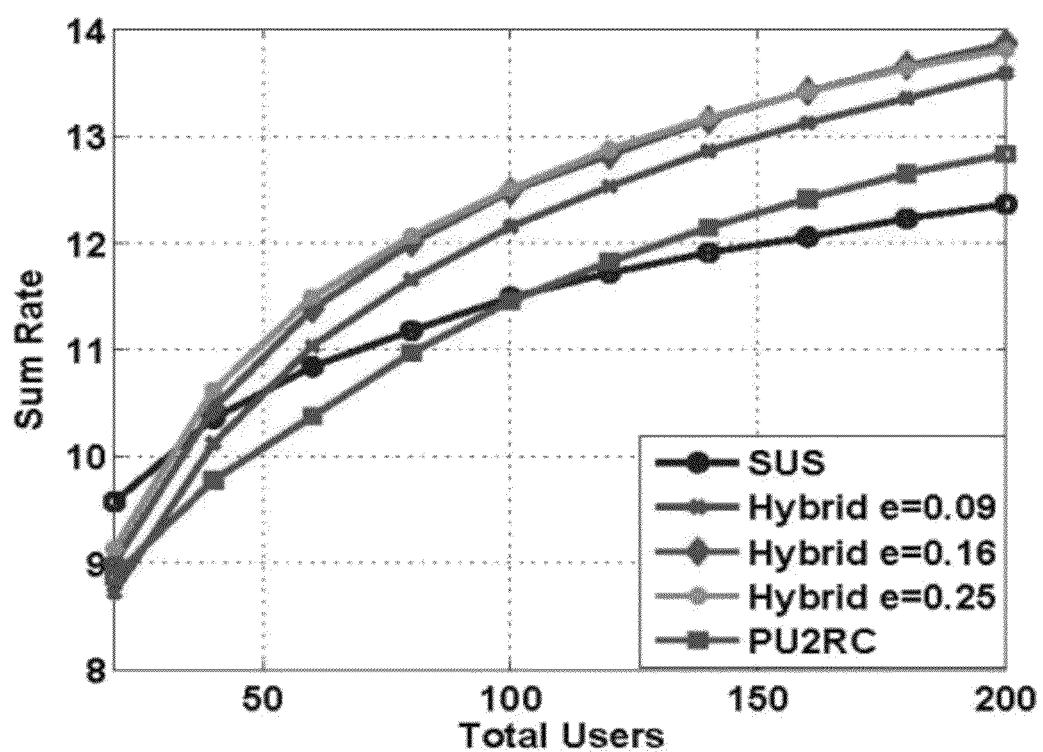
FIGS. 8 and 9 are graphs showing the sum-rate comparison of a ZFBF (SUS) scheme, a PU²RC scheme, and a hybrid scheme of the present invention with respect to users and radius (e) of training vector.
Figure 9:
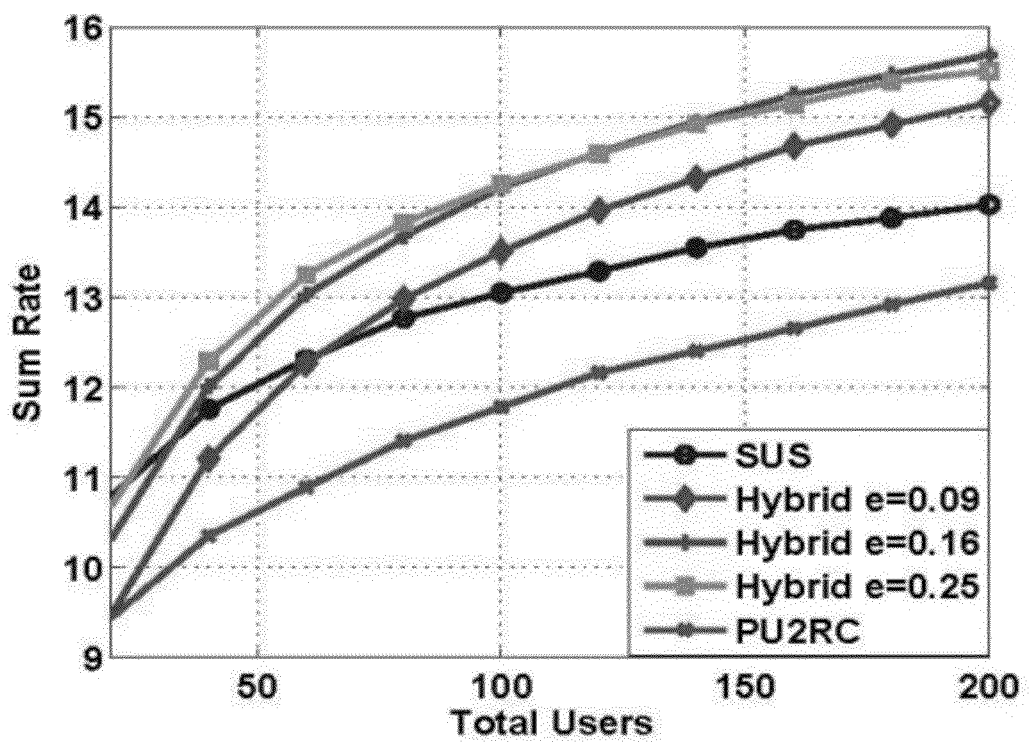

FIGS. 8 and 9 are graphs showing the sum-rate comparison of the ZFBF (SUS) scheme, the PU²RC scheme, and the hybrid scheme of the present invention with respect to users and radius (e) of training vector.

When the number (M) of transmitter antennas is 4, the number ($B_1$) of bits fed back by the parent matrix set is fixed to 1, and SNR is 20 dB, FIG. 8 represents that the number ($B_2$) of bits fed back by the child matrix set is 5 and FIG. 9 represents that the number ($B_2$) of bits fed back by the child matrix set is 7. In this case, the sum-rates were compared according to the radius (e) of the training vector.

It can be seen that the system performance of the hybrid scheme of the present invention is better than the ZFBF scheme or the PU²RC scheme, and in particular, the performance is further improved as the radius of the training vector increases. This is because increase in the radius of the training vector means increase in channel quality information.

In addition, the system performance can be improved as the number of feedback bits increases.

Figure 10:
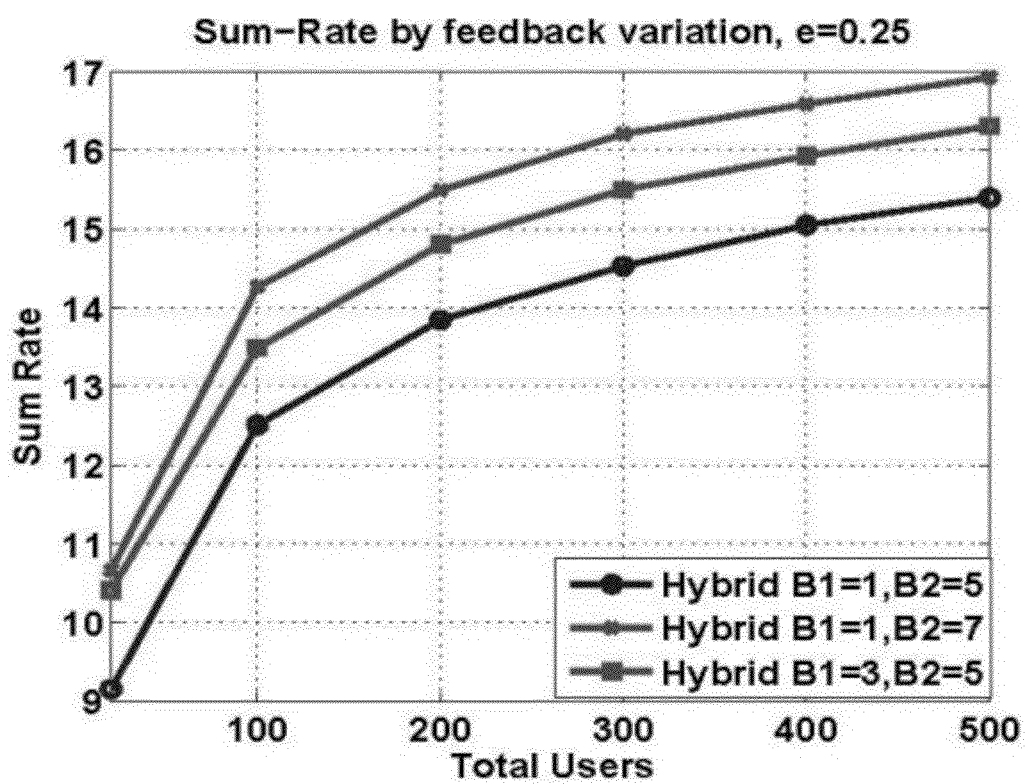
FIG. 10 is a graph showing the sum-rate comparison of a hybrid scheme of the present invention with respect to the number of feedback bits.

FIG. 10 is a graph showing the sum-rate comparison of the hybrid scheme of the present invention with respect to the number of feedback bits.

FIG. 10 represents that the number (M) of transmitter antennas is 4, SNR is 20 dB, and the radius of the training vector is fixed to 0.25. In this case, the sum-rates with respect to the number of total users were compared according to the number of feedback bits.

As can be seen from FIG. 10, the system performance becomes better as the number of total feedback bits increases, and in particular, the system performance becomes better as the weight of the number ($B_2$) of bits fed back by the child matrix set among the number of feedback bits increases.

FIG. 11 is a graph showing the sum-rate comparison of the ZFBF (SUS) scheme, the PU²RC scheme, and the hybrid scheme of the present invention with respect to SNR.

It can be seen that the performance of ZFBF is poor when the number ($K_T$) of total users is very large, e.g., 1000.

On the other hand, it can be seen that the hybrid scheme or the PU²RC scheme exhibit the system performance to some degree, but the hybrid scheme is better. In addition, when the number of feedback bits is 6, the system performance becomes better as the weight of the number of bits fed back by the child matrix set increases.

As such, in the hybrid MU-MIMO system of the present invention, since the search complexity of the receiver is proportional to $M2^{B_1}+2^{B_2}/M$, the system complexity can be reduced as $B_1$ is smaller and the weight of $B_2$ for the number of total feedback bits is larger. This can be easily confirmed from the graphs of FIGS. 5 to 11.

Therefore, due to the use of the hybrid codebook, the system complexity can be reduced and the inter-user interference can be approximated to 0, thereby remarkably improving the data transmission efficiency.

While certain embodiments have been described above, it will be understood to those skilled in the art that the embodiments described are by way of example only. Accordingly, the method for generating the hybrid codebook and the hybrid MU-MIMO system described herein should not be limited based on the described embodiments. Rather, the method for generating the hybrid codebook and the hybrid MU-MIMO system described herein should only be limited in light of the claims that follow when taken in conjunction with the above description and accompanying drawings.

What is claimed is:

1. A method for generating a hybrid codebook for a Multi-User Multiple-input Multiple-Output (MU-MIMO) system, comprising:

generating a parent matrix set including a plurality of M×M unitary matrices by a terminal, which is one of transmitter and receiver, when the number of transmitter antennas is M; and generating a child matrix set dependent on the parent matrix set by using training vectors included in a random training set and each column for each unitary matrix of the parent matrix set as an initial vector codebook by the terminal, wherein the transmitter derives channel quality information, at least in part, through manipulation of a child matrix selected from the child matrix set.

2. The method according to claim 1, wherein lower matrices included in the child matrix set are generated based on a Linde-Buzo-Gray (LBG) algorithm.

3. The method according to claim 1, wherein the number of the unitary matrices included in the parent matrix set is $2^{B_1}$ when the number of feedback bits for the parent matrix set is $B_1$, and the number of codewords of the child matrix dependent on each column of each unitary matrix is $2^{B_2}/M$ when the number of feedback bits for the child matrix set is $B_2$.

4. A receiver in a hybrid MU-MIMO system comprising:
a channel estimation unit configured to estimate a channel by using a pilot signal received from a transmitter in the hybrid MU-MIMO system;
a hybrid codebook including a parent matrix set with a plurality of unitary matrices and a child matrix set dependent on each column of the respective unitary matrices;
a beamforming matrix selection unit configured to select any one parent matrix among the parent matrix set by referring to the hybrid codebook, select any one child matrix as a beamforming matrix among the child matrix set dependent on the selected parent matrix, and providing the transmitter with channel quality information corresponding to the selected beamforming matrix and an index of the selected beamforming matrix; and
a demodulation unit configured to demodulate a signal received from the transmitter.

5. The receiver according to claim 4, wherein the beamforming matrix selection unit comprises:
a parent matrix selection section configured to search an index (j*) of the unitary matrix including a vector with a minimum distance in the channel estimated by the channel estimation unit, and search a codeword vector ($v_{i,j}$ ($1 \leq i \leq M$, $1 \leq j \leq 2^{B_1}$)) with a vector index (i*) to satisfy $$\{i*, j*\} = \operatorname*{argmax}_{i,j} |h_k^H v_{i,j}|^2 \ \forall \ i, j$$

in the searched unitary matrix (j*);
a child matrix selection section configured to find a codeword which satisfies $$l* = \operatorname*{argmax}_{l} |h_k^H c_{l,j*}|^2$$

with the searched unitary matrix (j*) and the vector index (i*) among $c_{l,j*}((i*-1)\cdot 2^{B_2}/M+1 \leq l \leq i*\cdot 2^{B_2}/M)$;

a channel quality information acquisition section configured to compute channel quality information corresponding to the codeword searched by the child matrix selection section; and
a feedback section configured to provide the transmitter with the index of the codeword and the channel quality information,
wherein M is the number of transmitter antennas, and $B_1$ is the number of feedback bits for the parent matrix set, and $2^{B_1}$ is the number of the unitary matrices included in the parent matrix set, and $h_k^H$ is the channel estimated by the channel estimation unit, and $h_k$ is M×1 channel vectors at user k, and H is a channel matrix
and $c_{l,j*}$ is a codeword included in the child matrix set and $B_2$ is the number of feedback bits for the child matrix set, and $2^{B_2}/M$ is the number of codewords of the child matrix dependent on each column of each unitary matrix.

6. The receiver according to claim 5, wherein the channel quality information is a signal to interference plus noise ratio (SINR).

7. A transmitter in a hybrid MU-MIMO system comprising:
a hybrid codebook including a parent matrix set with a plurality of unitary matrices and a child matrix set dependent on each column of the respective unitary matrices, wherein the child matrix set uses training vectors included in a random training set and each column for each unitary matrix of the parent matrix set as an initial vector codebook;
a scheduler configured to receive an index of a codeword and channel quality information fed back from a receiver in the hybrid MU-MIMO system, and select a precoding matrix and a user set having largest sum-rate;
a precoder configured to precode a plurality of input data, based on the precoding matrix selected by the scheduler; and
a modulation unit configured to modulate the precoded data.

8. The transmitter according to claim 7, wherein the scheduler comprises:
a sort section configured to sort user sets, depending on the size of the channel quality information received from the receiver;
a user set selection section configured to select a user set with the largest sum-rate with respect to the sorted user sets; and
a precoding matrix determination section configured to select the precoding matrix in a Semi-orthogonal User Selection (SUS) scheme by referring to the index of the codeword transmitted from the receiver and the hybrid codebook.

9. The transmitter according to claim 8, wherein the user set selection section selects the user set with the largest sum-rate by a greedy algorithm.

* * * * *